United States Patent
Baxley (10) Patent No.: US 6,217,806 B1
(45) Date of Patent: Apr. 17, 2001

(54) METHOD OF PRODUCING A TRANSPARENT SPHERICAL ARTICLE WITH AN OBJECT EMBEDDED THEREIN

(76) Inventor: Donald M. Baxley, 597 Zion Church Rd., Rockingham, NC (US) 28379

(*) Notice: Subject to any disclaimer, the term of this patent is extended or adjusted under 35 U.S.C. 154(b) by 0 days.

(21) Appl. No.: 09/131,087

(22) Filed: Aug. 7, 1998

(51) Int. Cl.[7] ..................................... B29C 43/18
(52) U.S. Cl. .................. 264/161; 264/162; 264/255; 264/275; 264/279.1; 264/273
(58) Field of Search ............................ 264/255, 340, 264/279.1, 161, 162, 273

(56) References Cited

U.S. PATENT DOCUMENTS

| | | | |
|---|---|---|---|
| 1,446,941 | * 2/1923 | Smith | 434/82 |
| 3,886,248 | 5/1975 | Nicholson | 264/102 |
| 4,116,439 | * 9/1978 | Chavarria et al. | 273/59 |
| 4,214,753 | * 7/1980 | Haber et al. | 273/59 R |
| 5,603,176 | 2/1997 | Eddins et al. | 40/409 |
| 5,672,089 | 9/1997 | Bermejo | 446/243 |

* cited by examiner

Primary Examiner—Jan H. Silbaugh
Assistant Examiner—Edmund H. Lee
(74) Attorney, Agent, or Firm—Rhodes & Mason, PLLC (57) ABSTRACT

An article of manufacture in the form of a novelty item comprising a solid spherical member having a smooth, polished outside surface. The member is comprised of a hard transparent material such as polyester, acrylic or polyurethane. A three-dimensional object having multiple voids is embedded in the transparent material. Preferably, the three-dimensional object is a model race car from which the windows have been removed. It has been discovered that when embedded in the transparent material, the model car has the appearance of having particularly clear windows.

7 Claims, 6 Drawing Sheets

METHOD OF PRODUCING A TRANSPARENT SPHERICAL ARTICLE WITH AN OBJECT EMBEDDED THEREIN

FIELD OF THE INVENTION

The present invention relates to an article of manufacture such as novelty items and, more particularly, to a method for making a transparent novelty item enclosing a three-dimensional object having a plurality of voids.

BACKGROUND OF THE INVENTION

As the interest in collectible items has increased recently, there has been an associated interest in developing methods for displaying small collectibles. These collectible items include small scale models of automobiles and the like. This interest stems from the decreasing market share held by miniature model cars, and particularly models of various types of racing cars. Typically, these items have been displayed using wall mounted display boxes or shelves. These display methods do nothing to enhance the appearance of these items and are rather limited in their potential uses. It is believed that a method of simultaneously displaying and enhancing the appearance of miniature model cars would rejuvenate the sales of the cars and expand the market for the cars to include serious adult collectors of racing memorabilia.

It would be desirable to provide a method for protecting these items, enhancing their appearance and adapting them for practical, everyday uses beyond that of a mere display piece. The present invention addresses this need.

SUMMARY OF THE INVENTION

The present invention relates to transparent novelty items having a spherical shape. It has been found that the appearance of three-dimensional objects may be greatly enhanced by a lens-like effect created by the transparent casting material used to create the novelty item. The transparent material magnifies and accentuates the appearance of the three-dimensional objects embedded in the material. Preferably, the novelty item is a 1:144 scale model race car.

The present invention includes an article of manufacture comprising a solid spherical member having a smooth, polished outside surface the sphere comprised of a hard transparent material. A three-dimensional object, preferably is a model race car from which the windows have been removed and containing a plurality of voids, is embedded in the transparent material wherein the object. Desirably, the voids are filled with the transparent material with substantially no trapped air in the voids. Preferred casting materials include transparent polyester, acrylic and polyurethane with polyester being preferred.

In an alternative embodiment, the novelty item may further comprise an internal cavity having an opening extending into the interior of the sphere. A cup-shaped insert is secured in the cavity. The insert may include internal threads for securing the novelty item to an automobile gear shift lever.

The invention further relates to an article of manufacture including a solid spherical member having a smooth, polished outside surface, the member comprised of a hard transparent material and a three-dimensional object embedded in the transparent material. Preferably, the object is a model race car from which the windows have been removed and which includes a plurality of voids. The voids are filled with the transparent material with substantially no trapped air in the voids. The member includes a cavity extending through the surface of the sphere and substantially radially thereinto and a cup-shaped insert secured in the cavity.

The present invention also relates to a method for making a transparent spherical novelty item. The method includes providing a two-part mold having a first upper portion and a second lower portion the mold having an internal substantially spherical cavity and a conduit in communication with the cavity and extending to the mold upper surface. Next, the lower portion of the mold spherical cavity is filled with a single layer of a liquid casting material capable of setting in a transparent condition. The first layer comprises between about 50 percent and about 60 percent of the volume of the cavity. The casting material is then permitted to harden to a gel-like consistency such that the casting material has just sufficient strength to support the weight of a small (about 1:144 to about 1:87 scale) model race car. A three-dimensional object, preferably a model race car, having a plurality of voids is then placed atop the casting material. The upper portion of the mold is then placed atop the second portion and the remaining volume of the cavity is filled with a second layer of liquid casting material so as to fill the voids in the novelty item with substantially no trapped air remaining in the voids. The casting material in the cavity is then permitted to cure to a rigid condition. Afterwards the mold is opened and the item is removed. Preferably, the casting material is one selected from the group consisting of liquid acrylic, polyester, and polyurethane.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention.

BRIEF DESCRIPTION OF THE DRAWINGS

The above and other objects, features, and advantages of the present invention will become more apparent and will be readily appreciated from the following detailed description of the preferred embodiments of the invention taken in conjunction with the accompanying drawings, in which.

DETAILED DESCRIPTION OF THE PREFERRED EMBODIMENT

In the preferred embodiment of the present invention illustrated in the Figures, like reference characters designate like or corresponding parts throughout the several views.

Figure 1:
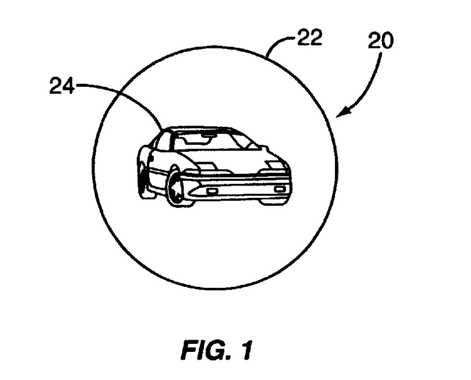
FIG. 1 illustrates a side view of a novelty item according to the present invention showing a three-dimensional object embedded in a rigid, transparent material.

As illustrated in FIG. 1, an article of manufacture in the form of a novelty item 20 in accordance with a first embodiment of the present invention includes a solid sphere 22 of a solid, transparent material in which is embedded a three-dimensional object 24. It has been found that the curved spherical surface tends to magnify the image of the three-dimensional object 24 embedded in the sphere 22. The object 24 includes a plurality of voids that have the potential to create air bubbles that detract from the appearance of the finished object. As used herein the term "voids" includes cavities, creases, pockets and other structural features that may tend to trap air if the object is submerged in a liquid. This term refers generally to both surface irregularities and open cavities that communicate with the outside surface of a three-dimensional object.

Model racing cars are a highly desirable three-dimensional object for use with the present invention. Preferably, a 1:144 scale, metal die cast model is embedded in the molding material. It has been found that this size model used in a spherical novelty item having a dimension of about 2½ inches provides very pleasing results. The clear casting resin tends to magnify the model and bring out the details of its construction. In a decorator's ornament embodiment a larger 1:87 scale model is used to create an embodiment having a diameter of between about 2 inches and about 3 inches. This embodiment preferably is displayed on a stand.

Figure 3:
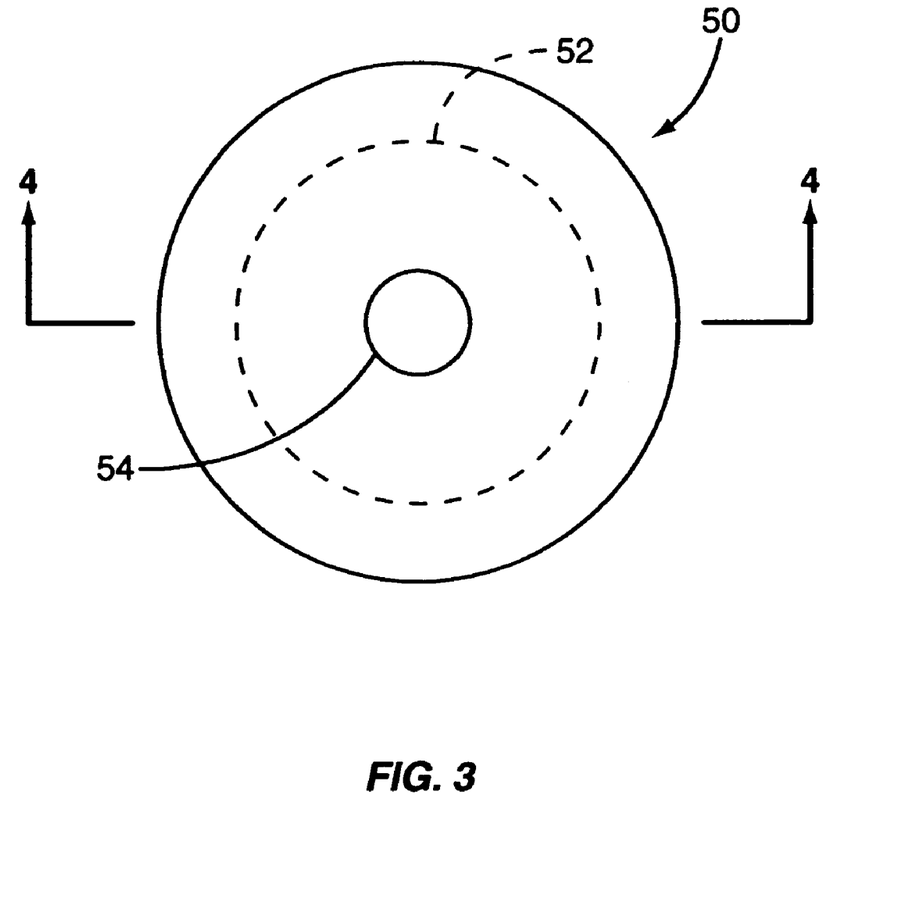
FIGS. 3–5 illustrate a mold used for casting the present invention
Figure 4:
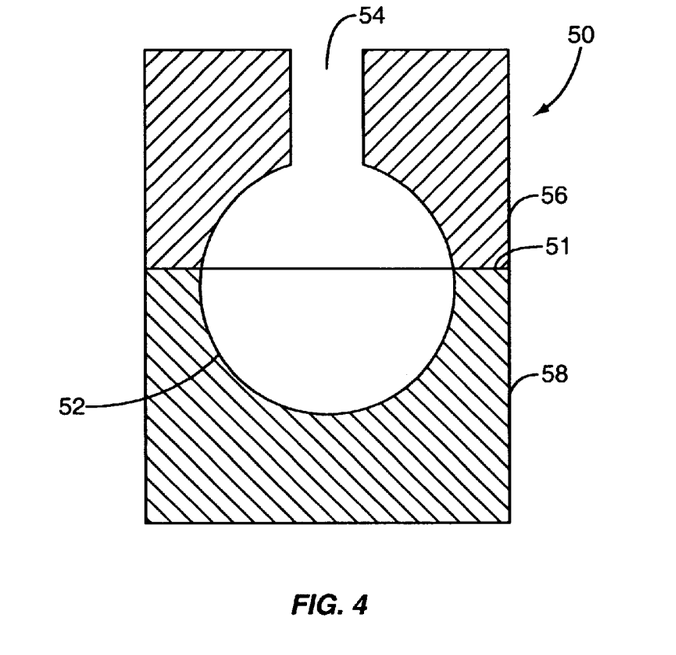
Figure 5:
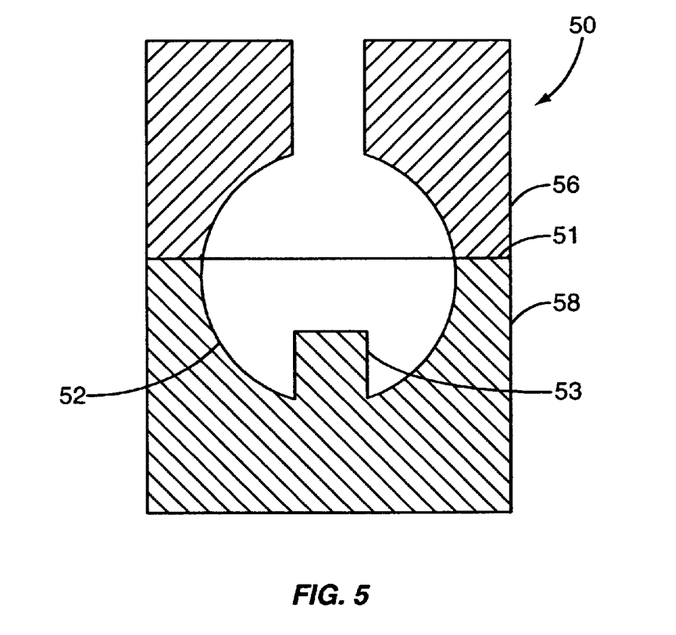

The novelty item of the present invention may be made using any suitable casting technique that embeds the model race car in a casting material while minimizing the creation of air bubbles. One mold and the method of making novelty item 20 are illustrated in FIGS. 3–9. A top view and cross-sectional views of the mold are shown in FIGS. 3–5 respectively. The mold includes a first upper portion 56 and a second lower portion 58. Spherical cavity 52 is centered internally within the mold. The cavity communicates with conduit 54 that extends from the cavity 52 to the upper surface of the mold to create a path for adding the casting material to the mold. The conduit will have a width of between about ¼ inch and about ½ inch. Desirably, it has a width of about ⅜ inch. The mold seam 51 should be positioned so that it is slightly above the equator of spherical cavity 52.

The casting process begins by removing the upper portion 56 of the mold and filling the lower half of spherical cavity 52 approximately to its equator line with the casting material. In a preferred embodiment the cavity is filled to between about 50 percent and about 60 percent of its volume. It will be appreciated that, because horizontal cut 51 was created above the equator of the cavity 52, filling the cavity to the equator line 53 leaves the casting material below the rim 53 of the circular opening in the lower mold half 58.

A suitable casting material for the practice of the present invention is a clear polyester casting resin available from Environmental Technology, Inc. This is a two-part liquid casting resin comprising a casting resin and a catalyst. Desirably, the temperature of both the resin itself and the area in which the casting is accomplished should be at least 70° F. If the casting operation is conducted at much lower or higher temperatures, the resin curing time will be increased or decreased accordingly. The casting step can be accomplished at temperatures below this limit but require additional steps to ensure the casting material is maintained at 70° F. Other suitable casting materials include acrylics and polyurethanes.

Figures 6, 7:
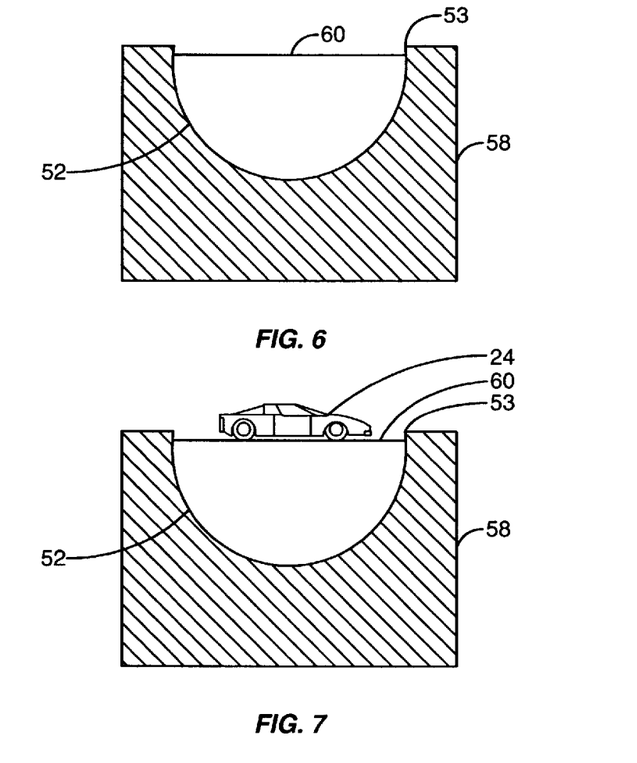
FIGS. 6–9 the steps of casting the novelty item of the present invention and the rough-finished item immediately after it is removed from the mold.

Turning now to FIG. 7, The three-dimensional object 24 is placed atop the casting material 60 after it has solidified to a gel-like consistency. The term "gellike" refers to a hardness and consistency similar to that of a gelatin. Desirably, the gel hardness attained should be sufficient to support the weight of a metal, miniature model car of a scale size between about 1:144 and about 1:87. If the casting material is too soft or liquid, the three-dimensional object 24 may sink into the casting material and may be more likely to trap air. The casting material must have sufficient strength to support the weight of the three-dimensional object for a sufficient time to complete the casting process. It has been found that if the polyester casting material is allowed to become too firm, then the surface of the first layer will be clearly discernible in the finished transparent item. When the item is then viewed from the side, the first layer will create a "pour line" effect. This effect is not necessarily objectionable for all uses of the multiple embodiments of the present invention. However, where this effect is aesthetically objectionable to a customer, the set up time allowed for the first layer is important and must be controlled carefully. In addition, the orientation of the object 24 may shift if it sinks into the first layer, detracting from the appearance of the finished item.

In a preferred embodiment, this object 24 is a small model race car. An important aesthetic consideration for the finished novelty item is the elimination of air bubbles that may be trapped in certain parts of the model race car. Avoiding this problem requires filling the voids, i.e., the interior cavities, of the model car with resin to prevent the formation of air bubbles. In this regard it is also important to remove any windows from the model car before encasing the car in the molding material. This is because it has been found that during casting the windows take on a cloudy appearance that detracts from the appearance of the finished item. It is believed that the heat generated as the casting material cures causes this to happen. Further, the windows impede the free flow of the liquid casting material into the model car interior cavity. The term "windows" as used herein includes a one-piece plastic casting often used with such model cars. This one-piece part may form the front window and the back window for the model car. Yet another advantage of removing the windows is that, unexpectedly, the clear molding material in its finished polished state gives the embedded model car the appearance of having particularly clear windows.

Desirably, the model car is set on its wheels on the gelled casting material as shown in FIG. 7. It has been found that this position minimizes the tendency of the model car to trap air. By way of comparative example, placing the model car on the gelled casting material upside down caused the creation of a large air pocket covering most of the roof of the car. Similar experiments with placing the model car on its end also gave unsatisfactory results.

Figure 8:
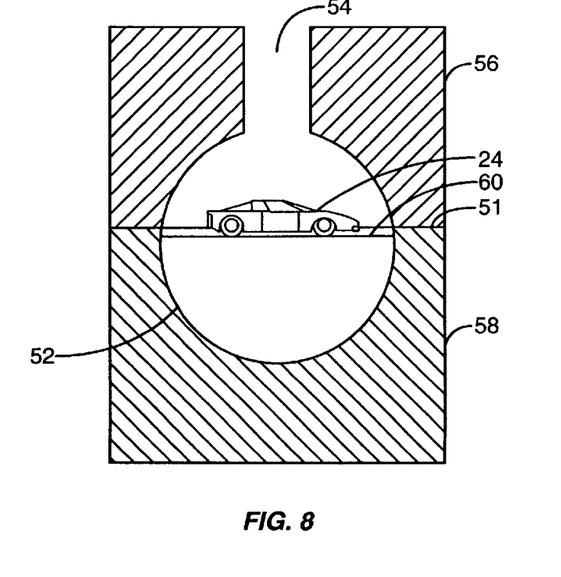

Next, the upper mold half 56 is secured in place atop lower mold half 58 as shown in FIG. 8. The two mold halves 56,58 may be secured to each other using some type of banding as is well known in the art. The remaining portion of spherical cavity 52 is then filled with additional casting material 60 via conduit 54. The casting material should be added slowly to completely fill any internal voids or recessed portions in the three-dimensional object 24. Sufficient casting material 60 should be added to just come up into the lower portion of conduit 54.

The casting material is then allowed to harden and cure to a rigid condition. The curing time will vary depending on the size of the finished object, humidity, ambient temperature and the amount of catalyst added to the casting resin. For a spherical casting having a diameter of about 2½ inches, a curing time of about 1½–3 hours is appropriate at a room temperature of about 75° F.

Figure 9:
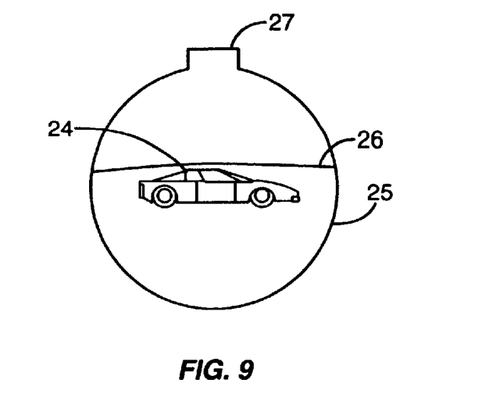

After a sufficient curing time has elapsed, the rough-finished novelty item 25 is removed from the mold 50 and has the appearance shown in FIG. 9. The rough-finished novelty item 25 may have a mold line or "flashing" 26 created by the seam between upper and lower mold halves 56, 58. In this state, the rough-finished item 25 may also have a protuberance 27 extending from its surface at the location of the conduit 54 resulting from any excess casting material that entered conduit 54 during casting. Although the mold surface is smooth, the rough-finished item 25 will not have the smooth, polished surface of the finished item but will have an almost opaque appearance.

The rough-finished item 25 next goes through a series of sanding and polishing steps. In a preferred this finishing process starts with sanding the rough-finished item 25 using a 180 grit sandpaper. Next, the sanding step is repeated using increasing fine sand paper such as 320, 600, 1500, and 2000 grit. The outside surface is then finished with a polishing compound. It is believed that once the flashing 26 and any protuberance 27 have been removed, the remaining polishing steps could be accomplished in a rotary tumbler type polisher.

The fabrication method just described illustrates one method for producing the novelty item of the present invention. It is envisioned that the best mode for production of the novelty item is to employ automated casting and polishing techniques suitable for high volume production. These mass production technologies feature the creation of a vacuum in the mold cavity to eliminate any trapped air in the model race car. The vacuum takes advantage of atmospheric pressure to push the casting material fully into voids of the three-dimensional object. Additional casting techniques may also be used so long as they meet the objective of embedding the three-dimensional object without creating air bubbles in the finished item.

Figure 10:
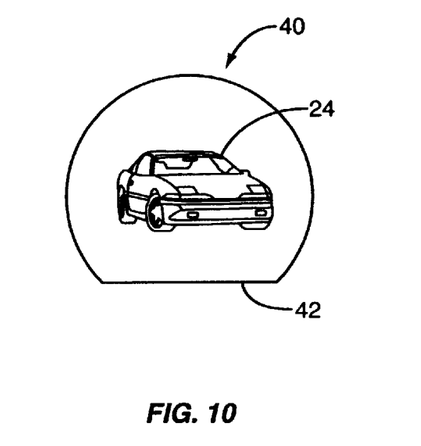
FIG. 10 illustrates a paper weight embodiment of the present invention comprising an essential spherical novelty item embedded in a rigid transparent material and having a flat bottom.

The structure of the novelty item may be modified in a number of different ways as described below. First, a flat bottomed embodiment having a diameter of about 2 inches as shown in FIG. 10 may be used as a paper weight 40. It will be readily apparent that the form 32 used to create cavity 52 in mold 50 is essentially spherical but is truncated to provided with a flat bottom 42 on paper weight 40. Again, a three-dimensional object 24 is embedded in the clear casting material. This flat bottomed embodiment may be adapted for use as a desk ornament by increasing the diameter to about 4–5 inches. The desk ornament may be displayed on a display pedestal constructed of wood, glass or a thermoplastic material. In a preferred embodiment the pedestal has a base diameter of about 3½ inches, a height of 1¾ inches and a display leg centered on the base and having a diameter of about ½ inch.

Figure 2:
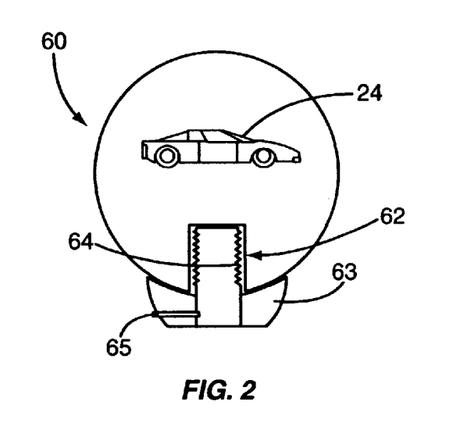
FIG. 2 illustrates a gear shift knob embodiment of the present invention.
Figure 11:
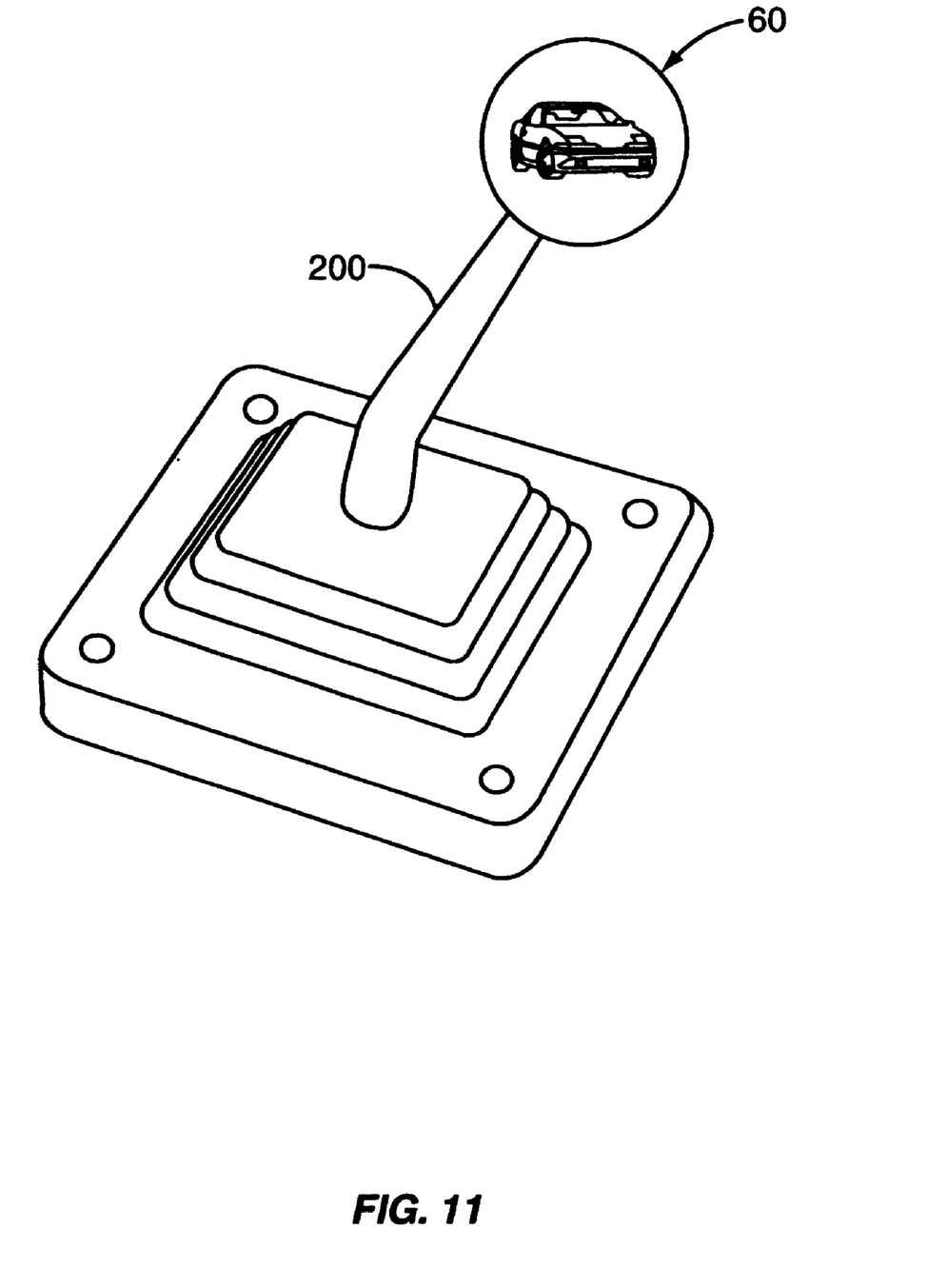
FIG. 11 illustrates a the gear shift lever knob embodiment of the present invention as it appears when installed on an automobile gear shift lever.

FIG. 2 illustrates a much different novelty item application. Here the novelty item 60 has been adapted to serve as a gear shift knob for an automobile shifting lever. The mold used to create this embodiment includes a cylindrical protuberance 53 that extends upwardly from the bottom of the mold cavity 52 so as to create a cavity 62 in the lower half of the rough finished object. In order to present an acceptable appearance in the finished novelty item 60, the interior of cavity 62 must be sanded and polished in the same fashion as the exterior of the item. Next, a threaded insert 63 is secured inside the cavity using additional casting resin. Use of the casting resin as a "glue" in this instance is desirable because the resin provides a substantially clear bond between the insert 63 and the cavity 62. The insert may include internal threaded portion 64 for attachment to a gear shift lever. The thread size may vary from about a ½×18 thread count to about a ⅜×20 thread count. Alternatively, insert 63 may include provisions for attachment to the gear shift knob using set screw 65. The insert opening may vary in size between about 5/16 inch and about ½ inch. Desirably, the insert is constructed from metal to take advantage of its strength. In yet another embodiment the threaded connection and the set screw attachment may be used together for additional holding power. Each of these methods of attachment are well known in the art. This embodiment may have a diameter of about 2 inches and is shown installed on a gear shift lever 200 in FIG. 11.

Figure 12:
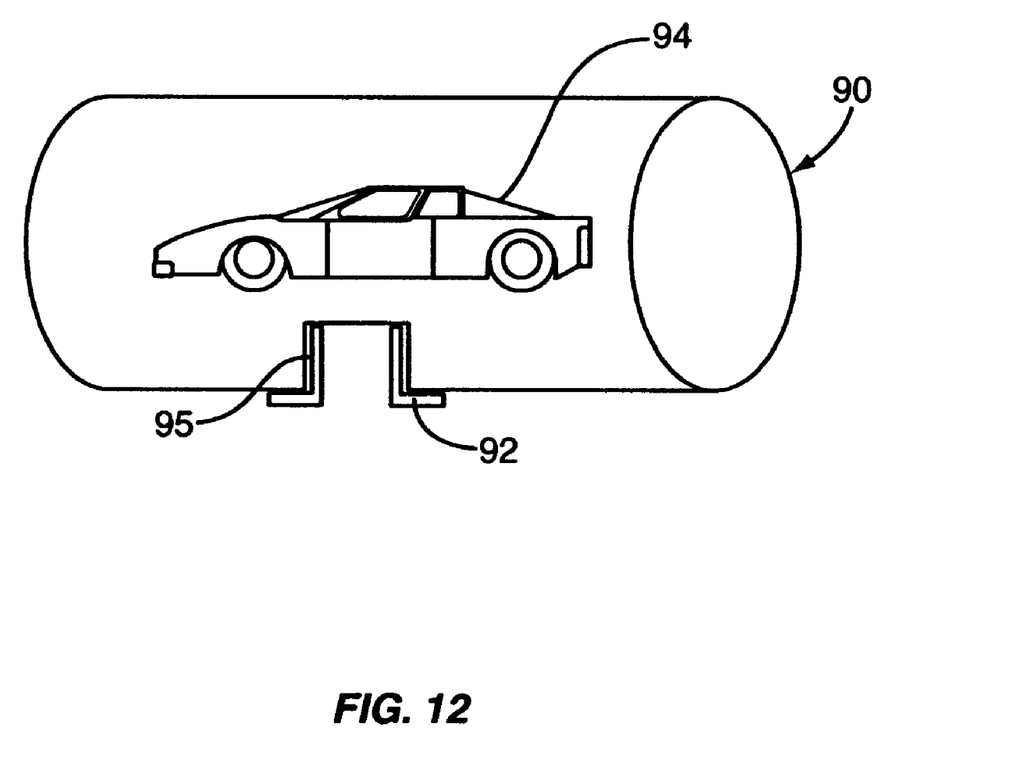
FIG. 12 illustrates an alternative gear shift lever embodiment of the present invention.

An alternative gear shift lever embodiment 90 is shown in FIG. 12. This embodiment is shown in cross-section and has a generally cylindrical shape and a smooth polished surface. It is intended to a accommodate model car 94 having a length over about 1¼ inches and up to about 3 inches. The lengthwise axis of the model car is aligned parallel to the lengthwise axis of the cylinder forming the gear shift lever. This embodiment includes a mounting insert 92 secured inside a cavity similar to that discussed above. When installed on a gear shift lever, this embodiment has a T-shaped appearance.

Figure 13:
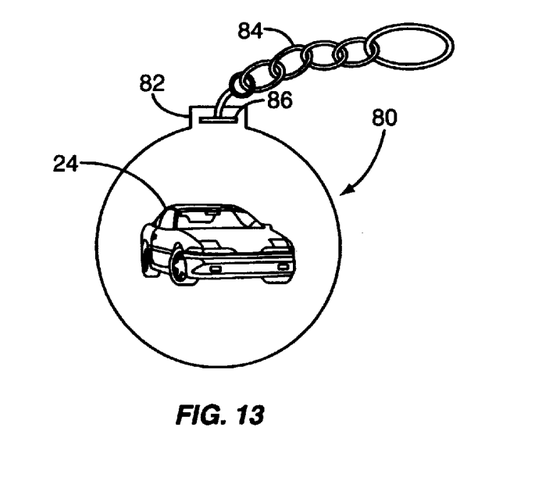
FIG. 13 illustrates a key chain embodiment of the present invention.

Yet another embodiment of the present invention is depicted in FIG. 13. Here the novelty item has been adapted for use as a key chain 80. This embodiment also includes a small protuberance 82 extending from the spherical surface of the object 80. Key chain member 84 is embedded in the protuberance while it is in a gelled state during casting. An anchor 86 may be provided at the end of the key chain portion to securely engage the casting material and hold the key chain in place. Alternatively, the chain member may be attached by drilling a hole in protuberance 82, inserting the chain into the hole and filling the hole with liquid casting resin. The size of the spherical novelty item 80 may be reduced slightly in this embodiment to facilitate a better fit in a trouser or coat pocket. This embodiment may have a diameter of between about 1⅝ inch and about 2 inches. The length of the key chain may vary between about 3¼ inches and about 4 inches. Other diameters and key chain lengths may be used depending on the size of the embedded three-dimensional object.

Other types of three-dimensional objects may be suitable for the practice of their present invention if they include a plurality of voids that are filled using the casting technique described herein.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method of making a solid transparent spherical article of manufacture comprising:

a. providing a two-part mold having an upper portion and a lower portion, the mold having an internal substantially spherical cavity and a conduit in communication with the cavity and extending through the upper portion of said two-part mold;

b. filling the lower portion of said mold with a single layer of a liquid casting material capable of setting in a transparent condition the first layer comprising between about 50 percent and 60 percent of the volume of the cavity;

c. permitting the casting material to harden to a gel-like consistency;

d. removing the windows from a model car having wheels and an interior cavity;

e. placing the model car atop the casting material wheel-side down;

f. placing the upper portion of the mold atop the lower portion and filling the remaining volume of the cavity with a second layer of liquid casting material thereby filling the interior cavity with the casting material of the second layer that freely flows into the interior cavity, the filled interior cavity having substantially no trapped air therein;

g. permitting the casting material in the cavity to cure to a rigid condition thereby producing the solid transparent spherical article; and h. opening the mold and removing the solid transparent spherical article.

2. The method of claim 1 further comprising finishing the surface of the article to a smooth polished finish.

3. The method of claim 1 wherein the casting material is selected from the group consisting of liquid acrylic, polyester, and polyurethane.

4. The method of claim 1 wherein the mold is composed of a room temperature vulcanizing silicone rubber.

5. The method of claim 1 wherein the model car is a model race car.

6. The method of claim 1 wherein the step of filling the remaining volume of the cavity includes filling the conduit with the casting material of the second layer to a height of about $3/8$ inch above the top of the cavity.

7. A method of making a transparent spherical article with an object embedded therein comprising:

a. providing a two-part mold having an upper portion and a lower portion, the mold having an internal substantially spherical cavity and a conduit in communication with the cavity and extending through the upper portion of said two-part mold;

b. filling the lower portion of said mold with a single layer of a liquid casting material capable of setting in a transparent condition the first layer comprising between about 50 percent and 60 percent of the volume of the cavity;

c. permitting the casting material to harden to a gel-like consistency;

d. removing the windows from a model race car to create a plurality of voids in said model race car;

e. placing said model race car wheel-side down atop the casting material, f. placing the first portion of the mold atop the second portion and filling the remaining volume of the cavity with a second layer of liquid casting material thereby filling the voids in the model race car with the casting material of the second layer that freely flows into the voids;

g. permitting the casting material in the cavity to cure to a rigid condition thereby producing the transparent spherical ariticle; and h. opening the mold and removing the transparent spherical article.

* * * * *